ASYMMETRIC PULSE TRAIN GENERATOR HAVING MEANS FOR REVERSING ASYMMETRY

Filed May 27, 1966

2 Sheets-Sheet 1

INVENTOR.
WILLIAM M. MC CAMMON
BY
HP Terry
ATTORNEY

July 30, 1968
W. W. McCAMMON
3,395,352
ASYMMETRIC PULSE TRAIN GENERATOR HAVING
MEANS FOR REVERSING ASYMMETRY
Filed May 27, 1966
2 Sheets-Sheet 2

INVENTOR.
WILLIAW M. MC CAMMON
BY
HP Terry
ATTORNEY

United States Patent Office 3,395,352
Patented July 30, 1968

3,395,352
ASYMMETRIC PULSE TRAIN GENERATOR HAVING MEANS FOR REVERSING ASYMMETRY

William W. McCammon, Merrick, N.Y., assignor to Sperry Rand Corporation, a corporation of Delaware Filed May 27, 1966, Ser. No. 553,481
4 Claims. (Cl. 328—46)

ABSTRACT OF THE DISCLOSURE

An asymmetric pulse train generating means having binary logic means for reversing the asymmetrical characteristic.

Figure 1:
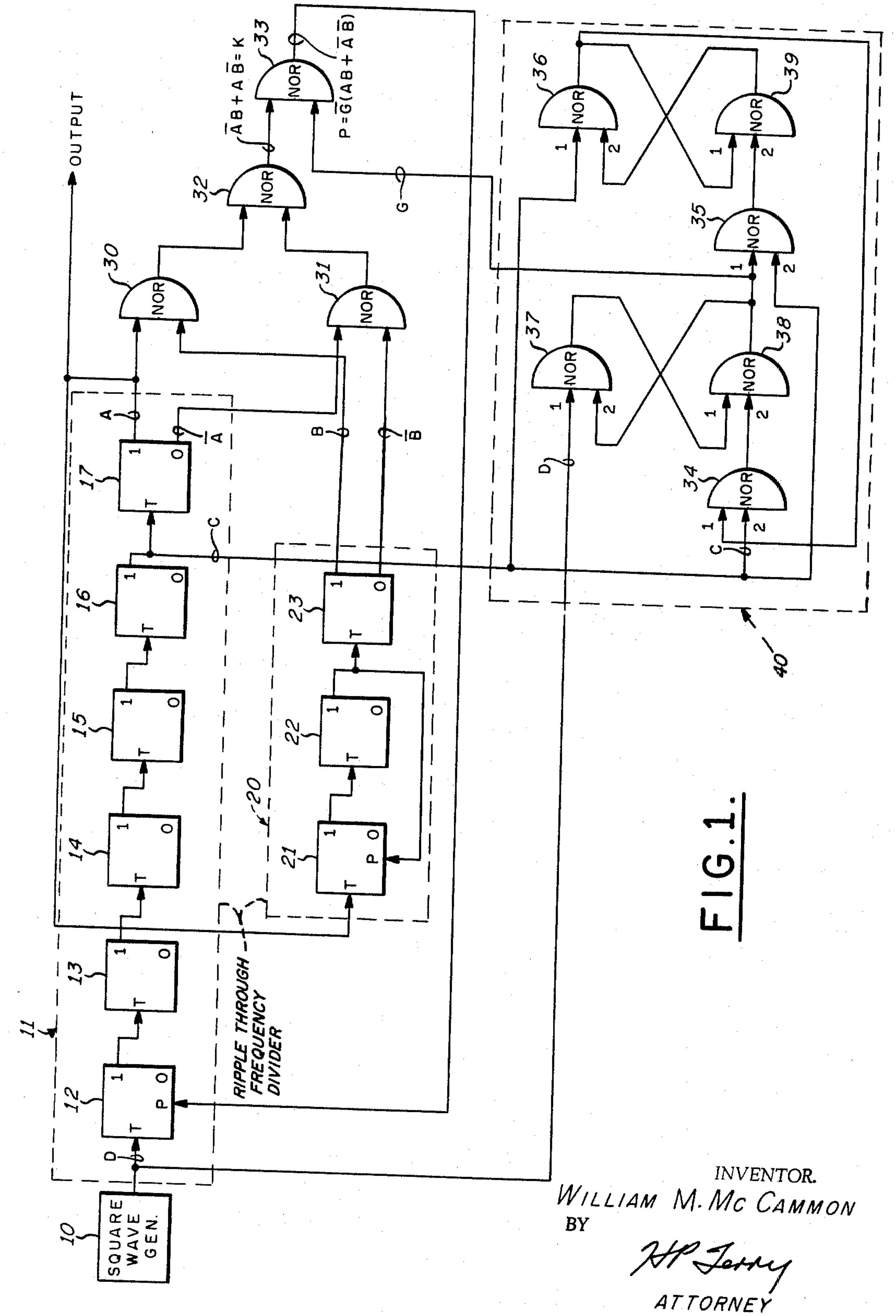

The present invention relates to an asymmetric pulse train generator having means for reversing the asymmetrical characteristic.

It has been found in gyroscopic apparatus that undesirable gyrospcopic drift can be reduced by rotating the intermediate races of each of two diametrically opposed compound bearings of the support mechanism in opposite directions and reversing the direction of rotation of each of the intermediate races periodically as disclosed in U.S. Patent No. 2,970,480, entitled "Anti-Friction Support Mechanism for Gyroscopic Devices," of Zeigler et al., issued Feb. 7, 1961, and assigned to the same assignee as the present invention. Further improvement in the averaging of the undesirable torques thereby reducing the drift characteristic can be achieved as disclosed in U.S. patent application S.N. 473,984, entitled "Anti-Friction Support Mechanisms for Gyroscopic Devices," of T. R. Quermann, filed July 22, 1965, and issued Jan. 30, 1968, as U.S. Patent No. 3,365,959, by asymmetrically driving the intermediate races in order that each bearing is driven further in one direction than the other such that the ball complement has a definite progression. Then the direction of asymmetry is periodically reversed to cancel the average bias torque created by the asymmetry.

The present invention provides apparatus for generating an asymmetric pulse train having an asymmetric reversing characteristic suitable for use with the apparatus of said U.S. patent application Ser. No. 473,984. One advantage of the circuit of the present invention is that the accuracy of the asymmetric timing provided by the asymmetric pulse train is a function only of the square wave frequency supplied as an input thereto. Thus, compensating adjustments and calibrations which would otherwise be required are unnecessary. Further, the complete circuit of the present invention can be fabricated by means of microcircuits and can be packaged in a very small container, for example, one cubic inch or less.

It is a primary object of the present invention to provide an asymmetric pulse train generator having means for reversing asymmetry.

It is another object of the present invention to provide an asymmetric pulse train generator having means for reversing asymmetry which requires no adjustments or calibration.

Figure 2:
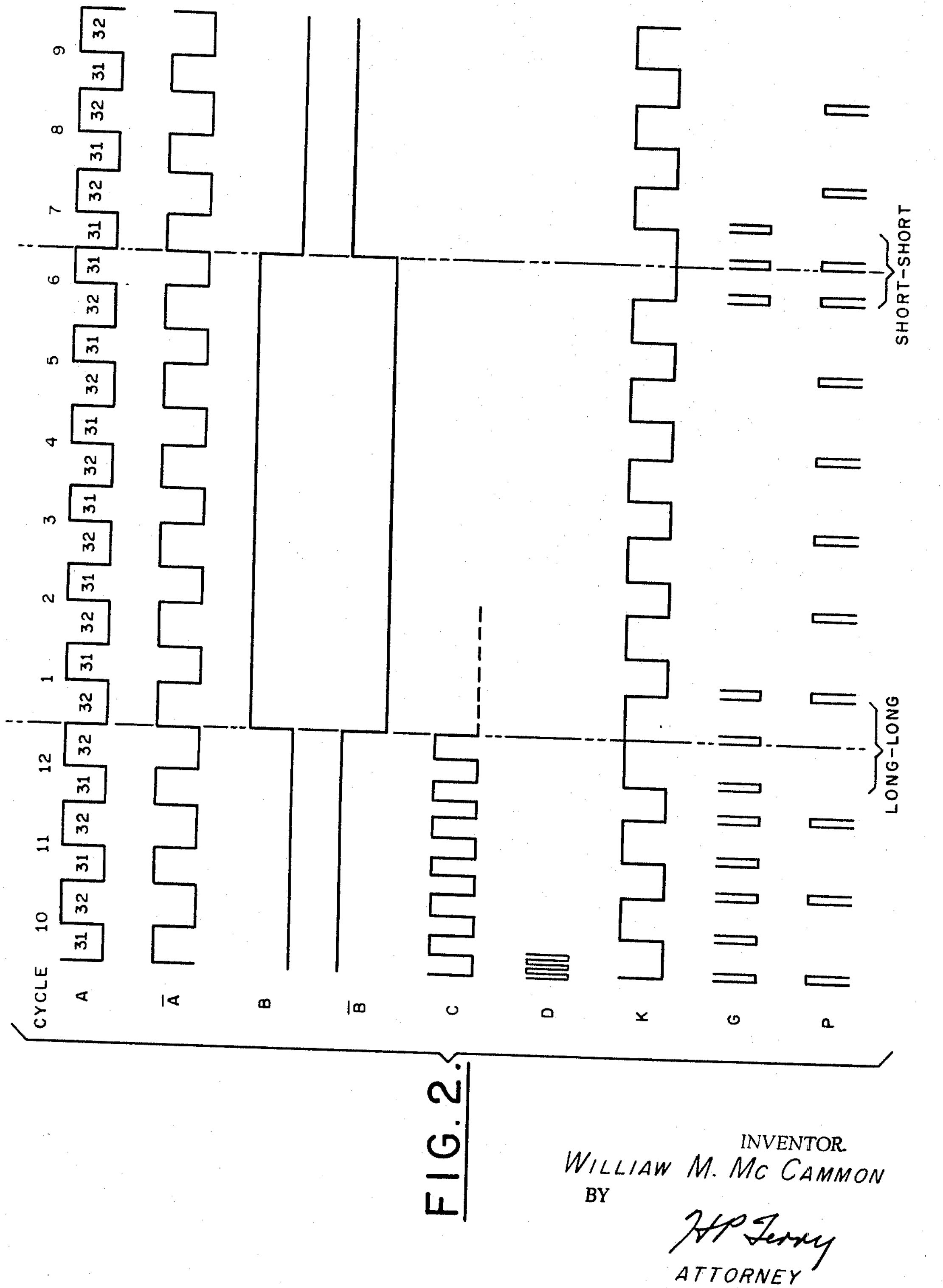

These and other objects of the present invention will become apparent by referring to the drawings in which:

FIG. 1 is an electrical schematic diagram in block form showing an asymmetric pulse train generating circuit having means for reversing asymmetry in accordance with the present invention; and FIG. 2 is a graph showing representative waveforms of the circuit of FIG. 1 and their interrelationships.

Referring now to FIG. 1, square wave generator 10 provides a symmetrical square wave D, as shown in FIG. 2 for example, having a 4.75 cycle per second frequency which is connected to a six-stage ripple thru frequency divider 11. The frequency divider 11 may be comprised of six flip-flop microcircuits interconnected to toggle in response to a binary ONE-ZERO state change of the input square wave D which is connected to the toggle input terminal T of the first stage flip-flop 12. The succeeding flip-flop stages 13 through 17 have their toggle input terminal T responsive to respective binary ONE outputs from respective preceding stages. The binary ONE output terminal of the flip-flop stage 16 provides a signal C in a manner to be more fully explained. The binary ONE output terminal of the flip-flop stage 17 provides an output A shown in FIG. 2 which is an asymmetric pulse train that may be utilized via a motor drive amplifier, for example as shown in U.S. patent application Ser. No. 363,245 of M. A. Schaffer et al., entitled "Antifriction Support Means for Gyroscopes," filed Apr. 28, 1964, and issued Aug. 22, 1967, as U.S. Patent No. 3,336,810, to drive a motor to provide the desired asymmetric bearing cycle as explained in said U.S. patent application Ser. No. 473,984. The binary ONE output terminal of the flip-flop stage 17 is also connected to a three-stage ripple thru frequency divider 20 having three flip-flops 21, 22, and 23. The toggle input terminal T of the flip-flop 21 is responsive to the signal A from the binary ONE output terminal of the flip-flop 17. The flip-flops 21 to 23 are connected to toggle when the signal A is subjected to a binary ONE-ZERO state change by having the binary ONE output terminals connected to respective toggle input terminals T of respective succeeding flip-flop stages, in a manner generally similar to that described with respect to frequency divider 11 except that to provide a divide-by-6 capability, the binary ONE output terminal of the flip-flop 22 is connected in feedback fashion to the PRESET input terminal of the flip-flop 21.

To provide for the asymmetric cycle as well as asymmetric reversing points as shown in graph A of FIG. 2, the flip-flop 12 has a PRESET input terminal responsive to a PRESET pulse P. The six-stage frequency divider 11 provides a divide-by-64 output from flip-flop 17 in the absence of a pulse P. The PRESET pulse P sets the flip-flop 12 at the start or in the middle of a count of 64 input pulses D such that with the PRESET pulse P input to the first stage flip-flop 12, the count is reduced from 64 to 63, i.e., the counter 11 begins a count from one rather than from zero due to the inserted PRESET pulse P. By pulsing the PRESET input terminal of the flip-flop 12 on either the 0 or the 32 count, the output stage flip-flop 17 will remain in the binary ZERO ($\overline{A}$) state for 31 counts or in the binary ONE (A) state for 31 counts respectively. In the absence of the PRESET pulse P, the binary ZERO and binary ONE states remain in their respective states for a full 32 counts. Thus, by alternating between 31 and 32 counts, the desired asymmetrical cycle is provided in the form of graphs A and $\overline{A}$ of FIG. 2.

However, the PRESET pulse P must be produced in accordance with a certain timing logic to provide the asymmetric cycles. Further, it is necessary to produce a periodic reversal of the asymmetry which is the purpose of the additional divide-by-6 frequency divider 20. It will be noted that the frequency divider 20 nominally is a divide-by-8. However, the feedback PRESET from the ONE state of the second stage flip-flop 22 alternately blocks the divide-by-2 action of the first stage flip-flop 21 thereby providing a divide-by-6 frequency divider. The outputs from the binary ONE and binary ZERO output terminals B and $\overline{B}$ are symmetrical as shown in FIG. 2.

In order to provide the required PRESET information in the form of PRESET pulse P for the asymmetric cycles, the outputs A and $\overline{A}$ and B and $\overline{B}$ are combined in accordance with the logic shown in the following truth table to provide PRESET pulses P for $AB+\overline{AB}$.

| Cycle | B | $\overline{B}$ | A | $\overline{A}$ | P | Count | |
|---|---|---|---|---|---|---|---|
| 12 | 0 | 1 | 0 | 1 | 1 | 31 | |
| | 0 | 1 | 1 | 0 | 0 | 32 | Long-Long |
| 1 | 1 | 0 | 0 | 1 | 0 | 32 | |
| | 1 | 0 | 1 | 0 | 1 | 31 | |
| 2 | 1 | 0 | 0 | 1 | 0 | 32 | |
| | 1 | 0 | 1 | 0 | 1 | 31 | |
| 3 | 1 | 0 | 0 | 1 | 0 | 32 | |
| | 1 | 0 | 1 | 0 | 1 | 31 | |
| 4 | 1 | 0 | 0 | 1 | 0 | 32 | |
| | 1 | 0 | 1 | 0 | 1 | 31 | |
| 5 | 1 | 0 | 0 | 1 | 0 | 32 | |
| | 1 | 0 | 1 | 0 | 1 | 31 | |
| 6 | 1 | 0 | 0 | 1 | 0 | 32 | |
| | 1 | 0 | 1 | 0 | 1 | 31 | Short-Short |
| 7 | 0 | 1 | 0 | 1 | 1 | 31 | |
| | 0 | 1 | 1 | 0 | 0 | 32 | |
| 8 | 0 | 1 | 0 | 1 | 1 | 31 | |
| | 0 | 1 | 1 | 0 | 0 | 32 | |
| 9 | 0 | 1 | 0 | 1 | 1 | 31 | |
| | 0 | 1 | 1 | 0 | 0 | 32 | |
| 10 | 0 | 1 | 0 | 1 | 1 | 31 | |
| | 0 | 1 | 1 | 0 | 0 | 32 | |
| 11 | 0 | 1 | 0 | 1 | 1 | 31 | |
| | 0 | 1 | 1 | 0 | 0 | 32 | |

This is accomplished by connecting the binary ONE output terminals of the flip-flops 17 and 23 carrying signals representative of A and B, respectively, to input terminals of a NOR gate 30 and by connecting the binary ZERO output terminals of the flip-flops 17 and 23 carrying the signals $\overline{A}$ and $\overline{B}$ to input terminals of a NOR gate 31. The NOR gates 30 and 31 in turn are connected to a NOR gate 32 which in turn is connected to another NOR gate 33. The output terminal of the NOR gate 32 provides a signal $\overline{K}$ as shown in FIG. 2 representative of $AB+\overline{AB}$ which is the information desired for the PRESET pulse P but it is present for a complete half cycle of the output whereas it should be in the form of a pulse to be present only for the first or 32nd input cycle of signal D to the flip-flop 12.

This is accomplished by gating logic circuitry 40 in the following manner. The binary ONE output terminal of the flip-flop 16 carrying the signal C as shown in FIG. 2 is connected to respective input terminals of NOR gates 34, 35 and 36. The square wave generator 10 also has its output terminal carrying the signal D connected to an input terminal of a NOR gate 37. The output terminal of the NOR gate 34 is connected to an input terminal of a NOR gate 38 which has its other input terminal responsive to the output from the NOR gate 37. The output of the NOR gate 38 is connected to respective input terminals of the NOR gates 33, 35 and 37. The output terminal of the NOR gate 35 is connected to an input terminal of a NOR gate 39 which has its other input terminal responsive to the output of the NOR gate 36. The output terminal of the NOR gate 39 is connected to the other input terminal of the NOR gate 36. The output terminal of the NOR gate 36 is also connected to the other input terminal of the NOR gate 34. The output terminal of the NOR gate 33 which carries the PRESET pulse P is connected to the PRESET input terminal of the flip-flop 12.

The gating required to provide pulse information in the form of PRESET pulse P as shown in FIG. 2 is accomplished in the NOR gate 33 with the gating logic provided by the NOR gates 34 through 39. The NOR gates 37 and 38 and the NOR gates 36 and 39 are connected as reset-set flip-flops, both of which are set by the absence of the signal C. The flip-flop 37, 38 sets first and when set allows the flip-flop 36, 39 to be set via NOR gate 35. When the flip-flop 36, 39 is set, it inhibits the SET signal from the flip-flop 37, 38 via NOR gate 34. The second half cycle of the input signal D will then reset the flip-flops 37, 38. In this manner a single gating pulse G as shown in FIG. 2 is provided at the beginning of each output half cycle, i.e., signal A. The pulse G is used to gate the $AB+\overline{AB}$ PRESET signal in the NOR gate 33 thereby providing a PRESET pulse P which results in an asymmetrical pulse train from the binary ONE output terminal of the flip-flop 17 having an asymmetric reversing cycle. The pulse train A shown in the graph of FIG. 2 has pulse widths represented by the numerals 31 and 32, respectively. This provides a pulse train of six pulses having alternate widths of 31 and 32 counts. When the pulse train reverses at the end of six and twelve cycles, it will be noted that there are two long or two short pulses adjacent to each other, i.e., having counts of 32, 32 or 31, 31 respectively thereby providing on a long-term basis a pulse train suitable for symmetrical torque averaging of a gyroscope.

To specifically explain the operation of the gating circuit 40 (NOR gates 34 through 39), the sequence of events for one complete cycle will now be discussed. Initially, it is assumed that the signals C and D are one and about to return to zero, the outputs of the gates 36 and 37 are zero and therefore the outputs of the gates 38 and 39 which form the other portion of the respective flip-flops are 1 as shown in the chart below in which the upper and lower input terminals of the respective NOR gates 34 through 39 are designated 1 and 2, respectively.

| Gate | Input 1 | Input 2 | Output |
|---|---|---|---|
| 34 | 0 | 1 | 0 |
| 38 | 0 | 0 | 1 |
| 37 | 1 | 1 | 0 |
| 35 | 1 | 1 | 0 |
| 39 | 0 | 0 | 1 |
| 36 | 1 | 1 | 0 |

Now the signals C and D return to zero and initially conditions are as shown below:

| Gate | Input 1 | Input 2 | Output | |
|---|---|---|---|---|
| 34 | 0 | 0 | 1 | |
| 38 | 0 | 1 | 0 | Gating signal G |
| 37 | 0 | 0 | 1 | |
| 35 | 0 | 0 | 1 | |
| 39 | 0 | 1 | 0 | |
| 36 | 0 | 0 | 1 | |

Then the 1 output from gate 36 blocks the input gate 34 changing its output from 1 to 0. The 1 output from the gate 36 is also provided to the gate 39 which continues to provide a 0 output. The 1 output from the gate 37 further blocks the gate 38 which provides a gating signal G to the gate 33 and a 0 to the gate 37. The next event to occur is the change of state of the signal D from 0 to 1 which results in gate 37 providing a 0 to the gate 38 thus producing a 1 output which terminates the gating signal G. The 1 output from the gate 38 is also supplied to the gate 37. The next event to occur is the change of state of the signal C from 0 to 1 which is applied to gates 34, 35 and 36. The gate 34 continues to provide a 0 to the gate 38 thereby continuing its 1 output. The gates 34 through 39 are now reset to their initial conditions as shown in the first chart above and await the next 1 to 0 state change of the signal C.

It will be appreciated that although the present invention has been described with respect to a particular input square wave and freqeuncy divider resulting in a particular asymmetrical count, the present invention may be arranged to have a greater or lesser count and the logic circuitry may be arranged to provide for different asymmetrical reversal.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. An asymmetric pulse train generator having means for reversing asymmetry comprising (a) first multistage frequency dividing means responsive to a first signal having a predetermined frequency for providing first and second pulse trains having predetermined pulse widths as a function of the number of said stages, (b) said first dividing means including PRESET means for varying said pulse widths in accordance with a PRESET signal, (c) second multistage frequency dividing means responsive to said first pulse train for providing third and fourth pulse trains having predetermined pulse widths, (d) first gating means responsive to said first, second, third and fourth pulse trains for providing a first gating signal when pulses from said first and third pulse trains coincide and when pulses from said second and fourth pulse trains coincide, (e) second gating means responsive to said first signal and to signals from an intermediate stage of said first frequency dividing means for providing a second gating signal at the beginning of each pulse of said first pulse train, and (f) third gating means responsive to said first and second gating signals for providing said PRESET signal when said first and second gating signals coincide whereby said first pulse train is asymmetrical as a function of said PRESET signal.

2. An asymmetric pulse train generator of the character recited in claim 1 in which said first multistage frequency dividing means comprises a flip-flop defining each stage interconnected to provide a ripple thru characteristic which may be varied in accordance with said PRESET signal.

3. An asymmetric pulse train generator of the character recited in claim 1 in which said second multistage frequency dividing means comprises a flip-flop defining each stage interconnected to provide a ripple thru characteristic which may be varied to provide a predetermined frequency division by interconnecting predetermined stages in feedback fashion.

4. An asymmetric pulse train generator of the character recited in claim 1 in which said first multistage frequency dividing means has six stages interconnected to provide a ripple thru characteristic with its first stage responsive to said PRESET signal and said second multistage frequency dividing means has three stages interconnected to provide a ripple thru characteristic with its second stage connected back to preset its first stage.

References Cited

UNITED STATES PATENTS

| | | | |
|---|---|---|---|
| 2,994,790 | 8/1961 | Delaney | 328—48 X |
| 3,096,483 | 7/1963 | Ransom | 328—48 |
| 3,295,065 | 12/1966 | Brown | 331—51 X |

JOHN S. HEYMAN, *Primary Examiner.*